(12) United States Patent
Baek et al.

(10) Patent No.: US 9,325,932 B2
(45) Date of Patent: Apr. 26, 2016

(54) METHOD FOR PROVIDING DATA APPLICATION BASED ON DISK MEDIA REPRODUCTION APPARATUS

(75) Inventors: Wonjang Baek, Seongnam-si (KR); John Kim, Seoul (KR); Seong Baek Lee, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 915 days.

(21) Appl. No.: 13/297,838

(22) Filed: Nov. 16, 2011

(65) Prior Publication Data

US 2012/0063745 A1 Mar. 15, 2012

Related U.S. Application Data

(63) Continuation of application No. 11/769,860, filed on Jun. 28, 2007, now abandoned.

(30) Foreign Application Priority Data

Apr. 19, 2007 (KR) .................. 10-2007-0038409

(51) Int. Cl.
*H04N 5/84* (2006.01)
*H04N 5/89* (2006.01)
*H04N 5/85* (2006.01)
*G11B 27/10* (2006.01)
*H04N 5/765* (2006.01)
*H04N 9/82* (2006.01)

(52) U.S. Cl.
CPC ............... *H04N 5/85* (2013.01); *G11B 27/105* (2013.01); *H04N 5/765* (2013.01); *H04N 9/8205* (2013.01)

(58) Field of Classification Search
USPC .................................. 386/332–337
See application file for complete search history.

(56) References Cited

U.S. PATENT DOCUMENTS

| 5,825,727 A | 10/1998 | Han .............................. 369/32 |
| 7,639,923 B2 | 12/2009 | Ikeda et al. |
| 2002/0183873 A1 | 12/2002 | Miura et al. ................... 700/94 |
| 2004/0010685 A1 | 1/2004 | Sakaguchi et al. ............ 713/168 |
| 2004/0199654 A1 | 10/2004 | Juszkiewicz .................. 709/231 |
| 2006/0098936 A1* | 5/2006 | Ikeda et al. .................... 386/46 |

(Continued)

FOREIGN PATENT DOCUMENTS

| EP | 1 551 027 A1 | 7/2005 |
| KR | 1998-0004631 A | 3/1998 |

(Continued)

OTHER PUBLICATIONS

Application Definition Blu-ray Disc Format BD-J Baseline Application and Loginal Model Definition for BD-ROM, Mar. 2005, Blu-ray Disc Association.

(Continued)

*Primary Examiner* — Nigar Chowdhury
(74) *Attorney, Agent, or Firm* — Stein IP, LLC

(57) ABSTRACT

A data application based on a reproduction apparatus of a disk media is disclosed. In accordance with method, a scene resource data corresponding to each scene of a data application based on a base data application of the disk media or the reproduction apparatus to execute the data application on a scene-by-scene basis, thereby minimizing a time required for the execution of the data application and a limit of a size of the data application, and providing the data application personalized based on a device information or a user information.

17 Claims, 2 Drawing Sheets

(56) References Cited

U.S. PATENT DOCUMENTS

| | | | |
|---|---|---|---|
| 2007/0110408 A1* | 5/2007 | Chang et al. | 386/126 |
| 2007/0147779 A1* | 6/2007 | Takakura et al. | 386/95 |
| 2008/0127246 A1* | 5/2008 | Sylvain | 725/32 |

FOREIGN PATENT DOCUMENTS

| | | |
|---|---|---|
| KR | 10-2006-0015728 A | 2/2006 |
| WO | WO 00/64178 A1 | 10/2000 |
| WO | WO 03/001801 A1 | 1/2003 |
| WO | WO 03/054696 A1 | 7/2003 |
| WO | WO 2004/102562 A1 | 11/2004 |
| WO | WO 2006/040580 A3 | 4/2006 |
| WO | WO 2006/073260 A3 | 7/2006 |
| WO | WO 2006/075884 A1 | 7/2006 |

OTHER PUBLICATIONS

Korean Notice of Allowance issued Apr. 18, 2008, issued to corresponding Korean Application No. 10-2007-0038409.

International Search Report issued Aug. 21, 2008, issued to corresponding International Application No. PCT/KR2008/001976.

European Search Report issued May 26, 2010, issued to European Application No. 08741221.9.

* cited by examiner

METHOD FOR PROVIDING DATA APPLICATION BASED ON DISK MEDIA REPRODUCTION APPARATUS

CROSS REFERENCE TO RELATED APPLICATIONS

This is a Continuation Application of U.S. application Ser. No. 11/769,860 filed Jun. 28, 2007 which claims priority from Korean Patent Application No. 10.2007-38409 filed Apr. 19, 2007. The entire disclosures of the prior applications are incorporated herein by references.

BACKGROUND OF THE INVENTION

1. Field of the Invention

The present invention relates to a method for providing a data application based on a reproduction apparatus of a disk media, and more particularly to a method for providing a data application based on a reproduction apparatus of a disk media wherein a scene resource data corresponding to each scene of a data application based on a base data application of the disk media or the reproduction apparatus to execute the data application on a scene-by-scene basis, thereby minimizing a time required for the execution of the data application and a limit of a size of the data application, and providing the data application personalized based on a device information or a user information.

2. Description of the Related Art

Generally, an optical disk is a mass storage media having an information stored therein wherein an information of a voice or an image converted to a digital code is read by recognizing an intensity of a reflected beam of a radiated laser beam thereon. A conventional optical disk comprises a compact disk (CD), a digital versatile disk (DVD) and a laser disk (LD).

However, as a High Definition (HD) broadcast gets popular, a development of a specification of an optical disk storage media of a next generation is in progress because the conventional storage media is not capable of storing a large amount of data.

The specification of the optical disk storage media of the next generation such as a HD-DVD specification and a Blu-ray disk specification has been proposed.

A HD-DVD employs a disk structure of the DVD to maintain a compatibility to the DVD while providing a density higher than that of the DVD. The HD-DVD has a capacity of 15 GB for a single layer disk and 30 GB for a dual layer disk based on a blue laser beam having a wavelength of 405 nm instead of a red laser beam having a wavelength of 650 nm.

While a Blu-ray disk uses the blue laser beam having the wavelength of 405 nm similar to the HD-DVD, the Blu-ray disk has a larger capacity of 25 GB for the single layer disk and 50 GB for the dual layer disk. In addition, when a quad-layer or an octa-layer is applied, the capacity may be increased to 100 GB and up to 200 GB.

As a result, as the HD-DVD or the Blu-ray disk compliant to the specification of the optical disk storage media of the next generation becomes popular, it may be expected that a user may enjoy a high definition video easily and a recording the large amount of data may be possible.

A development of an HDi (High Definition interactive) specification or a BD-J specification is in progress to provide a data application in a reproduction apparatus for playing back a data stored in the optical disk media such as the conventional CD, DVD and LD as well as the HD-DVD and the Blu-ray disk. The HDi is a standard specification for a data application service and advanced user menu function supported by the HD-DVD, and the BD-J is the standard specification for the data application service supported by the HD-DVD. The reproduction apparatus uses an interactive service specification for the optical disk media to embody and provide the data application.

However, providing the data application based on the reproduction apparatus has following problems.

A first problem is a limitation due to a limited resource of the reproduction apparatus.

Although a performance of the reproduction apparatus is improving, a size of the data application that may be processed in the reproduction apparatus is limited. That is, when the size of the data application is too large, the data application cannot be provided due to the limitation of processing resources such as a memory or a CPU.

In addition, when the HDi specification or the BD-J specification is employed, the reproduction apparatus may receive and provide the data application through a network connection to an external data application storage.

However, a bandwidth that may be allocated for a transmission and a reception of the data application is also limited. Therefore, in order for the user of the reproduction apparatus to receive the data application, a screen configuration or an image configuration should be limited when configuring the data application such that the data application may be received within the bandwidth. As a result, a versatile configuration cannot be employed, and a personalized data application cannot be provided.

Moreover, when the size of the data application is large, a long time is required from selecting the data application that is wanted by the user to providing the data application to the user. That is, because the data application is loaded and processed in the reproduction apparatus, a loading time and a processing time is long for the data application of the large size.

SUMMARY OF THE INVENTION

It is an object of the present invention to provide a method for providing a data application based on a reproduction apparatus of a disk media wherein a data application is executed on a scene-by-scene basis by obtaining a scene resource data corresponding to each of scenes of the data application based on a basic data application of the disk media or the reproduction apparatus to minimize a time required for an execution of the data application and a limitation in a size of the data application, and provide a personalized data application based on a device identification information or a user identification information.

In accordance with a first aspect of the present invention, there is provided a method for providing a data application based on a reproduction apparatus of a disk media, the method comprising steps of (a) executing a basic data application corresponding to an initial screen in order to provide the data application; (b) obtaining a scene resource data corresponding to a scene to be provided to a user from a plurality of scenes of the data application; and (c) executing the scene resource data to generate the scene to be provided.

It is preferable that the step (a) comprises: (a-1) reading and executing the basic data application from the disk media inserted in the reproduction apparatus.

Preferably the step (a-1) comprises: (a-2) reading and executing the basic data application from the disk media based on a user identification information pre-stored in the reproduction apparatus of the disk media.

It is preferable that the step (a) comprises: (a-3) reading and executing the basic data application pre-stored in the reproduction apparatus of the disk media.

Preferably the step (a) comprise: (a-4) updating the basic data application through a network connection to an external data application storage.

It is preferable that the step (a-4) comprises: (a-5) transmitting a device identification information of the reproduction apparatus or the user identification information pre-stored in the reproduction apparatus to the external data application storage; and (a-6) receiving the basic data application updated based on the device identification information or the user identification information selected from the basic data application stored in the external data application storage.

Preferably the step (a-1) comprises: (a-7) reading and executing the basic data application from the disk media to correspond to an insertion of the disk media or to a user input for the execution of the basic data application.

It is preferable that the step (a-3) comprises: (a-8) reading and executing the basic data application pre-stored in the reproduction apparatus of the disk media to correspond to a user input for the execution of the basic data application Preferably the step (a-3) comprises: (a-9) reading and executing the basic data application when the disk media is not inserted in the reproduction apparatus of the disk media It is preferable that the step (b) comprises: (b-1) obtaining the scene resource data from a plurality of scene resource data corresponding to the plurality of scenes to correspond to an identification information of the scene to be provided.

Preferably the scene resource data includes an execution code or a resource data per scene for the scene to be provided.

It is preferable that the scene resource data includes an identification information for obtaining other resource data.

Preferably the step (b) comprises: (b-2) reading the scene resource data from the disk media inserted in the reproduction apparatus.

It is preferable that the step (b) comprises: (b-3) receiving the scene resource data through a network connection to an external data application storage.

Preferably the step (b) comprises: (b-4) obtaining the scene resource data to correspond to a user input for the execution of the basic data application.

It is preferable that the step (b) comprises: (b-5) obtaining the scene resource data based on a device identification information of the reproduction apparatus or a user identification information pre-stored in the reproduction apparatus.

Preferably the step (b) comprises: (b-2) reading the scene resource data from the disk media inserted in the reproduction apparatus, and the step (b-2) comprises: (b-6) reading the scene resource data selected from a plurality of scene resource data for the data application stored in the disk media based on the device identification information or the user identification information to correspond to the scene to be provided.

It is preferable that the step (b) comprises: (b-3) receiving the scene resource data through a network connection to an external data application storage, and the step (b-3) comprises: (b-8) receiving the scene resource data selected from a plurality of scene resource data for the data application stored in the external data application storage based on the device identification information or the user identification information to correspond to the scene to be provided.

DETAILED DESCRIPTION OF THE INVENTION

The present invention will now be described in detail with reference to the accompanied drawings. The interpretations of the terms and wordings used in Description and Claims should not be limited to common or literal meanings. The embodiments are provided for the skilled in the art to more completely understand the present invention.

Figure 1:
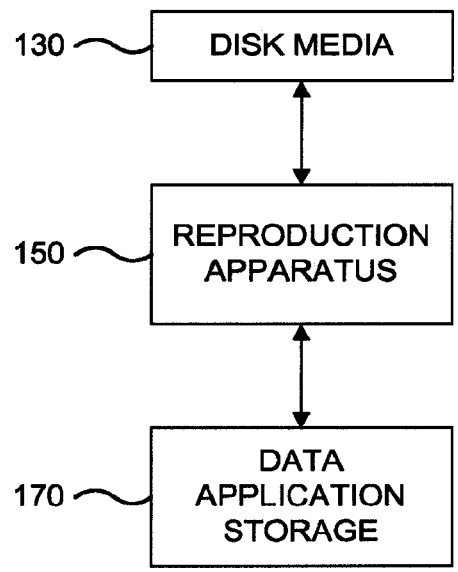
FIG. 1 is a diagram illustrating an environment of a method for providing a data application based on a reproduction apparatus of a disk media in accordance with the present invention.

FIG. 1 is a diagram illustrating an environment of a method for providing a data application based on a reproduction apparatus of a disk media in accordance with the present invention.

As shown, the environment of the method for providing the data application based on the reproduction apparatus of the disk media in accordance with the present invention comprises a disk media 130, a reproduction apparatus 150 of the disk media 130 and a data application storage 170.

The disk media 130 may be an optical storage media compliant to a Blu-ray specification or a HD-DVD specification which is capable of storing a large amount data. The disk media 130 may be an optical storage media compliant to a DVD specification.

A data application executable in the reproduction apparatus 150 of the disk media 130 may be stored in the disk media 130. That is, a manufacturer of a content that is stored in the disk media 130 may store the content and the data application related to the content in the disk media 130 such that the data application may be provided when the reproduction apparatus 150 is used to reproduce the disk media 130.

The reproduction apparatus 150 may be a disk media player that is capable of reproducing the optical storage media compliant to the Blu-ray specification or the HD-DVD specification. In addition, the reproduction apparatus 150 may be configured to be compliant to a specification that is capable of running the data application such as HDi and BD-J. An API such as a Java TV may be included in order to be capable of running the data application.

Moreover, the reproduction apparatus 150 may be connected to a display apparatus (not shown) to reproduce and display the content or execute and display the data application stored in the disk media 130. The display apparatus may be a television.

The data application storage 170 stores a plurality of the data applications in order to provide the data application and provides the data application at a request of the reproduction apparatus 150. For instance, the data application storage 170 may be connected to the reproduction apparatus 150 via a network such as the Internet.

When connected to the reproduction apparatus 150 through the network such as the Internet, the manufacturer of the content stored in the disk media 130 or a manufacturer of the reproduction apparatus 150 may operate the external data application storage 170 in order to provide the data application. The data application storage 170 stores a scene resource data that is obtained by dividing the data application scene-by-scene basis, and transmits the scene resource data according to a request of the reproduction apparatus 150.

The method for providing the data application based on the reproduction apparatus of the disk media in accordance with the present invention is described in detail with reference to the environment of the method for providing the data application shown in FIG. 1.

Figure 2:
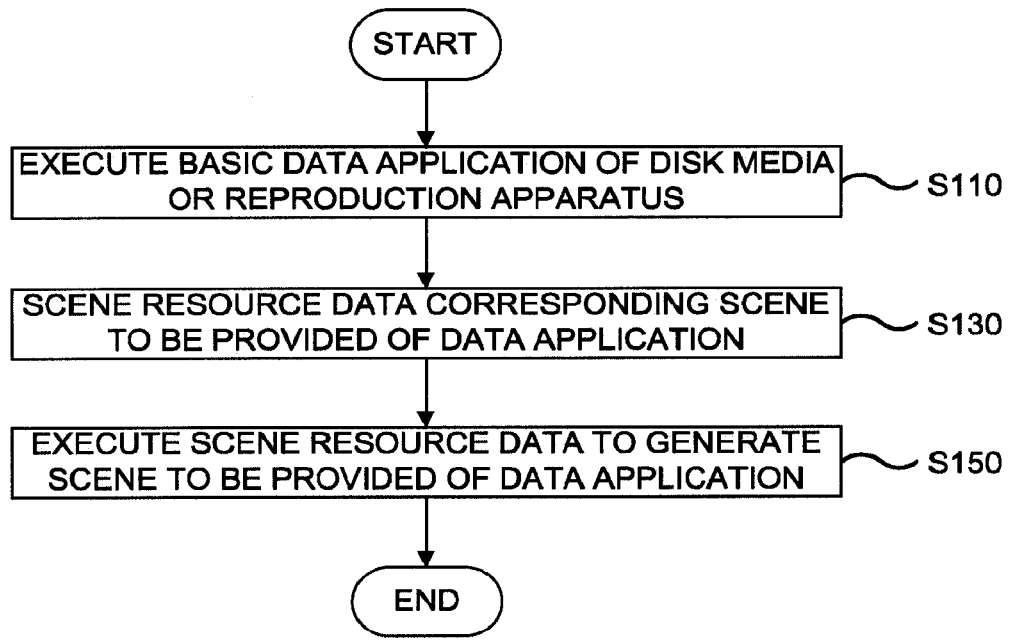
FIG. 2 is a flow diagram illustrating a method for providing a data application based on a reproduction apparatus of a disk media in accordance with the present invention.

FIG. 2 is a flow diagram exemplifying the method for providing the data application based on the reproduction apparatus of the disk media in accordance with the present invention.

Referring to FIG. 2, a basic data application corresponding to an initial screen is executed in order to provide the data application (S110).

That is, an interface is provided in order to provide the data application by executing the basic data application in the reproduction apparatus when the disk media is used or not used.

The basic data application, for instance, may be configured to process a menu having links and a user input to correspond to each functions of the data application.

The basic data application may be read from the disk media or the reproduction apparatus.

For instance, the manufacturer of the content stored in the disk media may include the basic data application to be executed when the disk media is inserted and read by the reproduction apparatus.

That is, the manufacturer of the content may include the basic data application in the disk media in order to provide the data application including an offer of an additional information, a sale and an advertisement regarding the content.

When the manufacturer of the content inserts the basic data application in the disk media, the reproduction apparatus may read the basic data application stored in the disk media inserted therein to execute the basic data application.

On the other hand, even when the manufacturer of the content inserts the basic data application in the disk media, a plurality of the basic data applications may be stored in the disk media.

The plurality of basic data application may be classified according to languages or ages.

When the plurality of basic data application is stored in the disk media, a process for reading and executing the basic data application stored in the disk media may be carried out by selecting a suitable basic data application from the plurality of the basic data applications.

For instance, the selection of the data application may be carried out using a device identification information of the reproduction apparatus.

That is, when a user environment of the reproduction apparatus is set to be Korean for example, the device identification information is configured to include such information. Accordingly, the basic data application that may be embodied based on Korean is read and executed from the plurality of the basic data applications stored in the disk media.

In addition, the selection of the basic data application may be carried out based on a user identification information pre-stored in the reproduction apparatus.

That is, when the basic data application is selected based on the user identification information, the reproduction apparatus may select the basic data application according to the user identification information which may be a 'minor' or an 'adult' or a 'gender'.

Through the selection of the basic data application, the basic data application suitable for the user may be read and executed.

On the other hand, a method for reading the basic data application from the disk media is as follows.

A first case is that the basic data application is read from the disk media.

The reproduction apparatus may be configured to automatically read and execute the basic data application stored in the disk media when the disk media is inserted.

In addition, the reproduction apparatus may be configured to receive a user input to read and execute the basic data application stored in the disk media when the user requests the data application to be provided, by pushing a button of a remote controller for instance, after the disk media is inserted therein.

A second case is that the basic data application is read from the reproduction apparatus.

When the basic data application is stored in the reproduction apparatus, the data application may be provided even when the disk media is not inserted in the reproduction apparatus.

For instance, the manufacturer of the reproduction apparatus may store the basic data application in the reproduction apparatus.

After the basic data application is stored in the reproduction apparatus, the reproduction apparatus may be configured to read and execute the stored basic data application when the reproduction apparatus is in operation.

The manufacturer of the reproduction apparatus may provide the data application for providing an advertisement or product thereof, various informations, a T-commerce and a banking service. In order to achieve this, the basic data application corresponding to an initial screen may be stored in the reproduction apparatus.

The manufacturer of the reproduction apparatus may provide a data application service corresponding to providing the data application in a digital broadcasting to the user using the reproduction apparatus via a network through above-described constitution.

In order to achieve this, the basic data application for providing the data application may be stored in the reproduction apparatus, and a configuration wherein the basic data application stored in the reproduction apparatus is read and executed is possible accordingly.

The reading and the execution of the basic data application stored in the reproduction apparatus may be configured to be automatically carried out when a power is applied to the reproduction apparatus.

Even when the basic data application stored in the reproduction apparatus is provided, the basic data application may be provided only when the user provides the user input such as pushing the button of the remote control to request the data application.

That is, when the reproduction apparatus receives the user input, the reproduction apparatus may read and execute the basic data application stored therein.

It is preferable that the basic data application of the disk media inserted in the reproduction apparatus is used even when the basic data application is stored in the reproduction apparatus.

Therefore, the reproduction apparatus may be configured to read and execute the basic data application stored in the reproduction apparatus only when the disk media is not inserted in the reproduction apparatus or the basic data application is not stored in the inserted disk media.

On the other hand, the basic data application may be updated via a network connection to the external data application storage when the basic data application is stored in the disk media or in the reproduction apparatus.

For instance, after the basic data application in addition to the content is stored in the disk media to be sold or the reproduction apparatus having the basic data application stored therein is sold, the manufacturer of the content or the manufacturer of the reproduction apparatus may change a configuration of the basic data application.

The reproduction apparatus may obtain the updated basic data application by carrying out the network connection to the external data application storage having the basic data application stored therein to change the basic data application.

On the other hand, a personalization of the basic data application is also possible.

The reproduction apparatus may update the basic data application for a personalization of the basic data application stored in the disk media or the reproduction apparatus. That is, the user may change a layout of a screen or a menu of the basic data application suitable for the user, and the update of the basic data application is possible via the network connection to the data application storage.

In accordance with the update, when the device identification information of the reproduction apparatus or the user identification information pre-stored in the reproduction apparatus is transmitted to the external data application storage. The external data application storage extracts the updated basic data application from the basic data application stored therein based on the device identification information or the user identification information, and the extracted basic data application is transmitted to the reproduction apparatus.

In such case, the reproduction apparatus may receive and provide the updated basic data application.

Thereafter, the scene resource data corresponding to the scene to be provided to the user is obtained from a plurality of scenes of the data application during the execution of the basic data application in the step S110 (S130).

In accordance with the method for providing the data application based on the reproduction apparatus of the disk media of the present invention, the data application includes the plurality of scenes and the data application may be configured to be executed independently on scene-by-scene basis.

While the data application is generated and stored in a manner that the data application is integrated for the plurality of scenes in accordance with the conventional art, the data application may be executed independently on scene-by-scene basis in accordance with the present invention.

Through such configuration, a disadvantage wherein a processing capability of the reproduction apparatus is limited or a size of the basic data application is limited due to a time limit required for receiving a data through the network for executing the data application when executing the data application is overcome.

That is, as an environment of the disk media is changed to an HD environment, the data application should be manufactured and executed according to the HD environment. However, the size of the data application is increased in such case. Moreover, as functions included in the data application are increased, the size of the data application is also increased. When the size of the data application is increased, the execution of the data application is limited due to the limitation of a processing capability. Moreover, when the data application is received and executed via the network, a time needed for the reception is increased, resulting in an inconvenience of the user.

However, in accordance with the present invention, the data application may be independently executed on scene-by-scene basis.

That is, because the scene resource data for the corresponding scene is obtained and executed according to the request of the reproduction apparatus after the scene resource data is generated and stored in a manner that the scene resource data includes a scene-by-scene executable code or resource data that is executable independently on scene-by-scene basis, the disadvantage of the conventional art such as the limitation of the processing capability and the time necessary for the reception are overcome while providing the data application including the various function under the HD environment.

The executable code is configured to comply with a data application specification such as HDi and BD-J and is a code that may execute a corresponding scene independently. The executable code may be configured to comply with a specification such as Java TV.

The resource data is an additional data. For instance, the resource data may include an image or a text to correspond to the scene of the data application, and may include a video or an audio data displayed in a portion of the scene of the data application. Moreover, the resource data may include a control box form for receiving selection of the user for a screen control.

In addition, the scene resource data may include an identification information for obtaining other resource data.

For instance, other functions of the data application may be provided by the link for other scenes of the scene provided according to the scene resource data. In order to achieve this, the scene resource data may include an identification information of other scene resource data for obtaining other scene resource data.

When the other scene resource data is received via the network, the identification information may include an information of a location on the network. Moreover, when the other scene resource data is read from the disk media, the identification information may include an identification information of a directory.

When the user input requesting other scenes is received while providing a specific scene of a plurality of scenes of the data application, the reproduction apparatus obtains the scene resource data corresponding to the identification information of the scene to be provided to the user from the plurality of scene resource data.

That is, when the data application is created, the scene resource data is constituted on the scene-by-scene basis and the identification information is then provided to the corresponding scene resource data. In such case, when the reproduction apparatus obtains the identification information for a specific scene, i.e. the identification information of the scene to be provided through the user input, the scene resource data corresponding to the scene to be provided may be obtained based on the identification information.

On the other hand, obtaining the scene resource data may be divided into two cases.

First case is that the scene resource data of the data application is stored in the disk media.

That is, the manufacturer of the content stores the data application in the disk media in case the reproduction apparatus is not connected to the network.

Even when the scene resource data of the data application is stored in the disk media, the reproduction apparatus reads and executes the scene resource data corresponding to the scene to be provided selected from the plurality of the scene resource data stored in the disk media based on the identification information upon receiving the user input for providing the data application through the basic data application.

Although the data application cannot be provided interactively by receiving various scene resource data through the network, various functions may be provided according to a selection of the data application stored in the disk media by the user.

Second case is that the scene resource data is received through the network connection to the external data application storage.

When the scene resource data is received through the network connection to the external data application storage, the manufacturer of the reproduction apparatus may provide the data application through the basic data application stored in the reproduction apparatus. In addition, even when the manufacturer of the content provides the basic data application, the scene resource data of the data application may be received through the network in order to provide various functions.

When the scene resource data is received through the network connection to the external data application storage, the reproduction apparatus receives and executes the scene resource data corresponding to the scene to be provided selected from the plurality of the scene resource data stored in the external data application storage based on the identification information upon receiving the user input for providing the data application through the basic data application.

On the other hand, a personalization of obtaining the scene resource data is possible.

In accordance with the conventional art, the personalization of the data application is difficult to embody due to the limitations such as the size of the data application.

However, in accordance with method of the present invention, the data application is divided on scene-by-scene basis.

The executable code or the resource data for the scene-by-scene basis division is included to constitute the scene resource data.

For instance, when the scene resource data is read by changing the resource data, the personalization may be easily embodied.

The reproduction apparatus may obtain the scene resource data based on the device identification information or the user identification information pre-stored in the disk media for the personalization.

In accordance with personalization, the reproduction apparatus uses the device identification information or the user identification information and the identification information for the scene to be provided to obtain the scene resource data when the scene resource data is read from the disk media.

That is, the scene resource data may be stored in the disk media for each user profile. For instance, the resource data may be configured differently according to the languages, the genders and the ages, and the reproduction apparatus may select the scene resource data according to the languages, the genders and the ages based on the device identification information or the user identification information.

Moreover, in accordance with the personalization, when the reproduction apparatus receives the scene resource data through the network connection to the external data application storage, the personalized scene resource data may be obtained as described below.

First, the reproduction apparatus transmits the device identification information or the user identification information and the identification information for the scene to be provided to the data application storage.

When the reproduction apparatus receives the scene resource data through the network connection to the external data application storage, the external data application storage selects the scene resource data to be transmitted to the reproduction apparatus from the plurality of scene resource data stored in the external data application storage based on the device identification information or the user identification information and the identification information for the scene to be provided.

Through the personalization process, the reproduction apparatus may receive the personalized scene resource data.

In addition, the reproduction apparatus may combine the executable code and the selected resource data to generate the personalized scene resource data.

Thereafter, the scene resource data obtained in the step S130 is executed to generate the scene to be provided (S150).

That is, because the data application is executed and provided on the scene-by-scene basis in accordance with the present invention, the reproduction apparatus generates the scene to be provided and the generated scene is transmitted to the display apparatus connected to the reproduction apparatus to provide the data application.

As a result, the manufacturer of the content may provide a data application service based on the disk media, and the manufacturer of the reproduction apparatus may provide the data application service based on the reproduction apparatus.

That is, the manufacturer of the content or the reproduction apparatus may provide a service-on-demand, an application-on-demand or a video-on-demand by using the basic data application and the data application. Moreover, the configurations of the basic data application and the data application may dynamically be updated or personalized when provided to the user after the manufacturing thereof. Therefore, a flexibility and an expandability are improved.

The data application service provided by the method in accordance with the present invention is not affected by the limitation in the size and the configuration thereof.

That is, even when the size of the data application is large, the data application is configured to be executed on the scene-by-scene basis such that the data application may be executed in the reproduction apparatus. In addition, when the data application is received through the network and then executed, the data application is independently received on the scene-by-scene basis to prevent the limitation of the reception time.

In other words, the reproduction apparatus executes the data application using a scene-by-scene loading wherein the data application is loaded the scene-by-scene basis to overcome the limitation. For instance, when the scene resource data includes the identification information for obtaining other scene resource data, the scene-by-scene loading may be carried out more efficiently.

For instance, in the conventional art, when the data application that is executable on the reproduction apparatus to correspond to a professional application is to be embodied for a complex function, the data application is very difficult to be embodied due to the size limitation.

However, in accordance with the present invention, the single data application is divided the plurality of scenes according to the function, and the reproduction apparatus executes the scene resource data on the scene-by-scene basis for the corresponding scene to embody the complex function. Moreover, adding other data application to the data application may be embodied by additionally linking the scene resource data for the corresponding function of other data application to provide the improved expandability. That is, the function of the other data application may be executed through the scene-to-scene jumping for various functions of various data applications.

The scene-to-scene jumping may be used during the selection of the scene resource data stored in the external data application storage that is to be transmitted to the reproduction apparatus. In addition, the scene resource data may be stored to be capable of the scene-to-scene jumping within the disk media, and the reproduction apparatus may select and obtain the scene resource data based on the scene-to-scene jumping. For instance, when the scene resource data includes the identification information for obtaining other scene resource data, the scene-by-scene loading may be carried out more efficiently.

Figure 3:
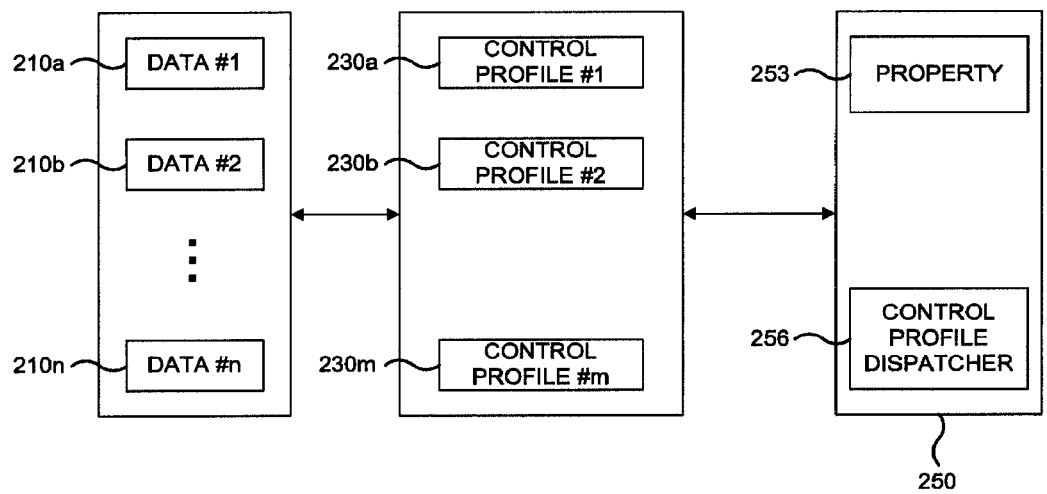
FIG. 3 is a diagram exemplifying a concept of providing a data application using a scene-by-scene loading and a scene-to-scene jumping in accordance with a method for providing a data application based on a reproduction apparatus of a disk media of the present invention.

FIG. 3 is a diagram exemplifying a concept of providing a data application using a scene-by-scene loading and a scene-to-scene jumping in accordance with the method for providing the data application based on the reproduction apparatus of the disk media of the present invention.

Referring to FIG. 3, a plurality of data 210a through 210n, a plurality of control profiles 230a through 230m and a model 250 are shown.

The plurality of data 210a through 210n are the scene-by-scene executable code or resource data. The plurality of data 210a through 210n may include a data for the personalization or the update of the basic data application.

The plurality of control profiles 230a through 230m selects and provides the plurality of data 210a through 210n according to a request from the model 250.

For instance, an extraction of the scene resource data of the data application from the plurality of data 210a through 210n is carried out.

The plurality of control profiles 230a through 230m carries out the extraction of the scene resource data according to a function of the data application or a personalized extraction of the data application based on the device identification information or the user identification information. In addition, each of the plurality of control profiles 230a through 230m is capable of an association with other control profiles. The association with other control profiles allows the scene-to-scene jumping.

The model 250 may comprise a property 253 and a control profile dispatcher 256.

The model 250 may include an information on the execution of the data application in addition to the property 253 and the control profile dispatcher 256. The control profile dispatcher 256 may include an information on a control of the plurality of control profiles 230a through 230m.

An embodiment of the plurality of data 210a through 210n, the plurality of control profiles 230a through 230m and the model 250 is as follows.

When the scene resource data is read and executed from the disk media, the model 250 and the plurality of control profiles 230a through 230m may be embodied in the reproduction apparatus, and the plurality of data 210a through 210n may be embodied in the disk media.

When the external data application storage is used, the model 250 may be embodied in the reproduction apparatus and the plurality of data 210a through 210n and the plurality of control profiles 230a through 230m may be embodied in the external data application storage.

Figure 4:
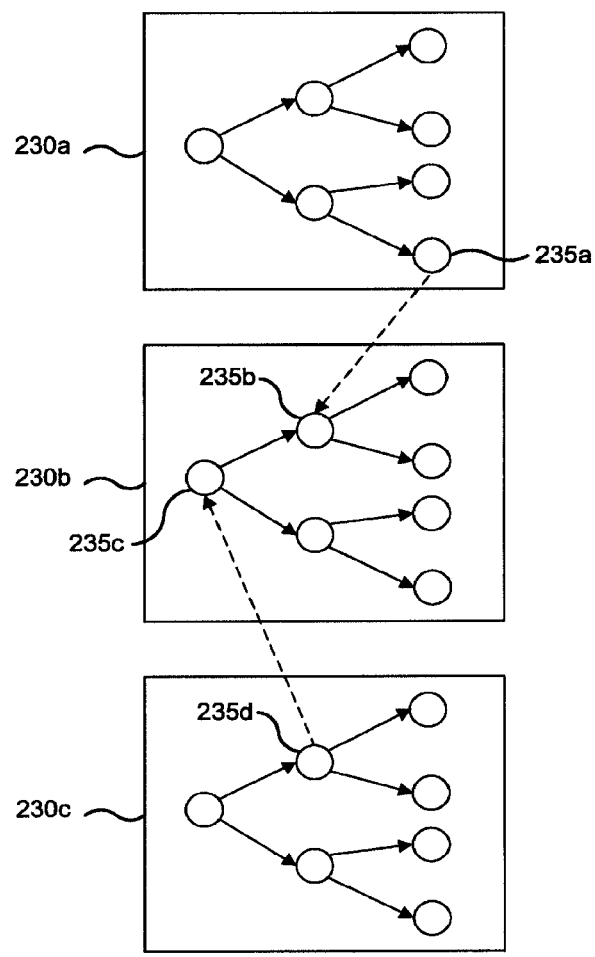
FIG. 4 is a diagram exemplifying a concept of a control profile in accordance with a method for providing a data application based on a reproduction apparatus of a disk media of the present invention.

FIG. 4 is a diagram exemplifying the concept of the control profile in accordance with the method for providing the data application based on the reproduction apparatus of the disk media of the present invention.

Referring to FIG. 4, three control profiles 230a through 230c are shown.

Each of the control profiles 230a through 230c comprises a plurality of control nodes, and each of the control nodes are denoted as a circle.

The conventional data application cannot include multiple functions due to problems such as a limit in size. Moreover, because an entirety of the conventional data application is received and executed, the size and the function are limited.

However, in accordance with the present invention, the control profile may be configured in a manner that the data application may be executed in a form of the scene resource data including the executable code and the resource data by dividing the data application on the scene-by-scene basis. Moreover, each function of the data application, i.e. the control profile may be associated to minimize the limit of the size and the function of the data application.

For instance, assuming that the control profile 230a is a profile for a function A of the data application, the control profile 230b is a profile for a function B of the data application, the control profile 230c is a profile for a function C of the data application, and that the scene resource data is connected in a control node format for a sub-scene required for the execution of each of the functions, a low-ranking control node 235a of the control profile 230a for the function A of the data application is associated with an intermediate-ranking control node 235b of the control profile 230b for the function B of the data application.

In such case, during the execution of the scene resource data corresponding to the function A of the data application, the scene resource data for an intermediate portion of the function B may be executed based on the user input. Such case is referred to as the scene-to-scene jumping.

Therefore, in a design of providing the data application, the limitation due to the size of the data application is minimized even when various functions are included.

Moreover, an intermediate-ranking control node 235d of the control profile 230c for the function C of the data application is associated with a top-ranking control node 235c of the control profile 230b for the function B of the data application to allow the scene-to-scene jumping.

On the other hand, the association may be expressed through an identifier.

For instance, the control profile 230a for the function A may be expressed as "ncfc://FuncA" and the control profile 230b for the function B as "ncfc://FuncB".

In addition, the low-ranking control node 235a of the control profile 230a may be expressed as "ncfc://FuncA/A/AA", and the intermediate-ranking control node 235b of the control profile 230b as "ncfc://FuncB/B". These expressions may also be embodied in the identification information of the scene. That is, the scene resource data is extracted for the scene to be provided through the control profile or the control node. The identifier is configured to correspond to the scene resource data, i.e. one of the plurality of data 210a through 210n of FIG. 3, and the identifier may be included in the scene resource data in order to allow a connection or a jumping to other control profile or control node.

For instance, when the scene is provided to correspond to the low-ranking control node 235a of the control profile 230a, the low-ranking control node 235a is associated with the intermediate-ranking control node 235b of the control profile 230b in the corresponding scene. Therefore, when an event occurs during the provision of the scene corresponding to the low-ranking control node 235a by the user input, the scene-to-scene jumping is carried out from the low-ranking control node 235a to the scene corresponding to the intermediate-ranking control node 235b of the control profile 230b.

In order to allow the scene-to-scene jumping, the low-ranking control node 235a of the control profile 230a may include an link "ncfc://FuncB" to the scene resource data corresponding to the intermediate-ranking control node 235b of the control profile 230b.

The various functions may be embodied in the data application through above-described configuration, and the association with other functions may be set to provide an expandability during a creation of the data application.

While the present invention has been particularly shown and described with reference to the preferred embodiment thereof, it will be understood by those skilled in the art that various changes in form and details may be effected therein without departing from the spirit and scope of the invention.

As described above, in accordance with the method of the present invention, the data application is executed on the scene-by-scene basis by obtaining the scene resource data corresponding to each of the scenes of the data application based on the basic data application of the disk media or the reproduction apparatus to minimize the time required for the execution of the data application and the limit of the size of the data application, and provide the personalized data application based on the device identification information or the user identification information.

Particularly, the manufacturer of the content or the reproduction apparatus may provide the service-on-demand, the application-on-demand or the video-on-demand through the reproduction apparatus using the basic data application and the data application, and the configuration of the basic data application or the data application may be dynamically updated or personalized when provided to the user after the manufacturing thereof to provide a flexibility and the expandability.

What is claimed is:

1. A method for providing a data application based on a reproduction apparatus of disk media, the method comprising steps of:
   (a) executing a basic data application corresponding to an initial screen in order to provide the data application;
   (b) obtaining a scene resource data corresponding to a scene to be provided to a user from a plurality of scenes of the data application; and
   (c) executing the scene resource data to generate the scene to be provided,
   wherein the step (a) comprises: (a-3) reading and executing the basic data application pre-stored in the reproduction apparatus of the disk media,
   wherein the data application includes a first control profile for a first function thereof and a second control profile for a second function thereof,
   wherein the scene resource data is connected in a control node format for a sub-scene required for execution of each of the first and second functions,
   wherein each of the first and second control profiles includes a plurality of control nodes having at least one higher-ranking node and at least one lower-ranking node,
   wherein each control node of the first control profile is associated with one of the plurality of control nodes of the second control profile to allow a scene-to-scene jumping,
   wherein the scene-to-scene lumping is executing the scene resource data of a designated portion of an associated control node during the execution of the scene resource data corresponding to one of the first and second functions of the data application.

2. The method in accordance with claim 1, wherein the step (a) comprises: (a-1) reading and executing the basic data application from the disk media inserted in the reproduction apparatus.

3. The method in accordance with claim 2, wherein the step (a-1) comprises: (a-2) reading and executing the basic data application from the disk media based on a user identification information pre-stored in the reproduction apparatus of the disk media.

4. The method in accordance with claim 2, wherein the step (a-1) comprises: (a-7) reading and executing the basic data application from the disk media to correspond to an insertion of the disk media or to a user input for the execution of the basic data application.

5. The method in accordance with claim 1, wherein the step (a) comprise: (a-4) updating the basic data application through a network connection to an external data application storage.

6. The method in accordance with claim 5, wherein the step (a-4) comprises:
   (a-5) transmitting a device identification information of the reproduction apparatus or the user identification information pre-stored in the reproduction apparatus to the external data application storage; and
   (a-6) receiving the basic data application updated based on the device identification information or the user identification information selected from the basic data application stored in the external data application storage.

7. The method in accordance with claim 1, wherein the step (a-3) comprises: (a-8) reading and executing the basic data application pre-stored in the reproduction apparatus of the disk media to correspond to a user input for the execution of the basic data application.

8. The method in accordance with claim 1, wherein the step (a-3) comprises: (a-9) reading and executing the basic data application when the disk media is not inserted in the reproduction apparatus of the disk media.

9. The method in accordance with claim 1, wherein the step (b) comprises: (b-1) obtaining the scene resource data from a plurality of scene resource data corresponding to the plurality of scenes to correspond to an identification information of the scene to be provided.

10. The method in accordance with claim 1, wherein the scene resource data includes an execution code or a resource data per scene for the scene to be provided.

11. The method in accordance with claim 10, wherein the scene resource data includes an identification information for obtaining other scene resource data.

12. The method in accordance with claim 1, wherein the step (b) comprises: (b-2) reading the scene resource data from the disk media inserted in the reproduction apparatus.

13. The method in accordance with claim 1, wherein the step (b) comprises: (b-3) receiving the scene resource data through a network connection to an external data application storage.

14. The method in accordance with claim 1, wherein the step (b) comprises: (b-4) obtaining the scene resource data to correspond to a user input for the execution of the data application.

15. The method in accordance with claim 1, wherein the step (b) comprises: (b-5) obtaining the scene resource data based on a device identification information of the reproduction apparatus or a user identification information pre-stored in the reproduction apparatus.

16. The method in accordance with claim 15, wherein the step (b) comprises: (b-2) reading the scene resource data from the disk media inserted in the reproduction apparatus, and the step (b-2) comprises: (b-6) reading the scene resource data selected from a plurality of scene resource data for the data application stored in the disk media based on the device identification information or the user identification information to correspond to the scene to be provided.

17. The method in accordance with claim 15, wherein the step (b) comprises: (b-3) receiving the scene resource data through a network connection to an external data application storage, and the step (b-3) comprises: (b-8) receiving the scene resource data selected from a plurality of scene resource data for the data application stored in the external data application storage based on the device identification information or the user identification information to correspond to the scene to be provided.

* * * * *